United States Patent [19]

Vandenkieboom et al.

[11] 4,288,182

[45] Sep. 8, 1981

[54] MACHINING APPARATUS TOOL FEED AND RETRACT SYSTEM

[75] Inventors: John Vandenkieboom, Troy; Douglas Myers, Sterling Heights, both of Mich.

[73] Assignee: LaSalle Machine Tool, Inc., Troy, Mich.

[21] Appl. No.: 121,747

[22] Filed: Feb. 15, 1980

[51] Int. Cl.³ .............................................. B23B 47/00
[52] U.S. Cl. ..................................................... 408/129
[58] Field of Search ......................................... 408/129

[56] References Cited

U.S. PATENT DOCUMENTS

| | | | |
|---|---|---|---|
| 3,469,496 | 9/1969 | McCann et al. | 408/129 |
| 3,512,433 | 5/1970 | Juhasz et al. | 408/129 |
| 3,704,957 | 12/1972 | Petroff | 408/129 |
| 3,807,510 | 4/1974 | Boom et al. | 408/129 |

*Primary Examiner*—Harrison L. Hinson
*Attorney, Agent, or Firm*—Olsen and Stephenson

[57] ABSTRACT

Machining apparatus for machining a workpiece with a work-performing tool comprising a frame on which a tool carrier is mounted for reciprocal movement toward and away from the workpiece and a feed unit for moving the tool carrier between a partially retracted position and a fully retracted tool change position and for moving the tool carrier from the partially retracted position reciprocally through a machining stroke to machine a workpiece. The feed unit includes a drive transmitting assembly which is reciprocally mounted on the frame and which comprises extensible and contractible means connected to the tool carrier. A first drive means reciprocates the drive assembly while the extensible and contractible means remains fixed so as to move the tool carrier reciprocally through a machining stroke and a second drive means actuates extensible and contractible means to move the tool carrier between its partially and fully retracted positions.

19 Claims, 12 Drawing Figures

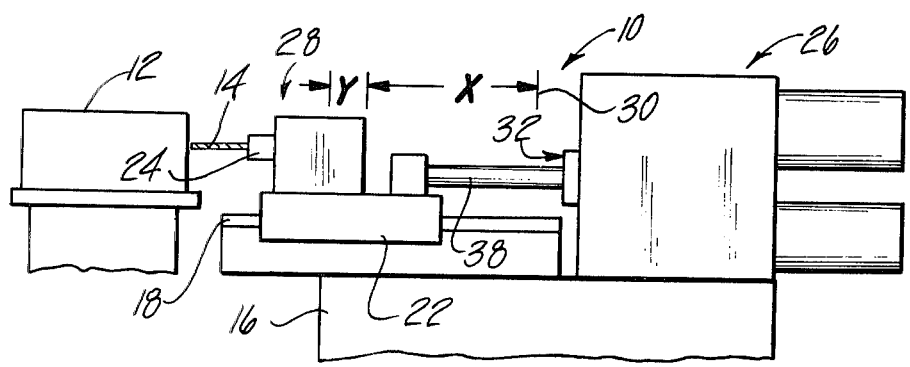
Fig-1
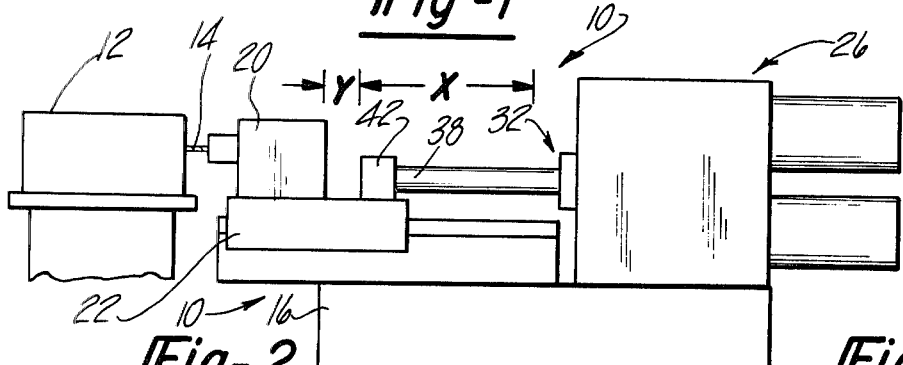
Fig-2
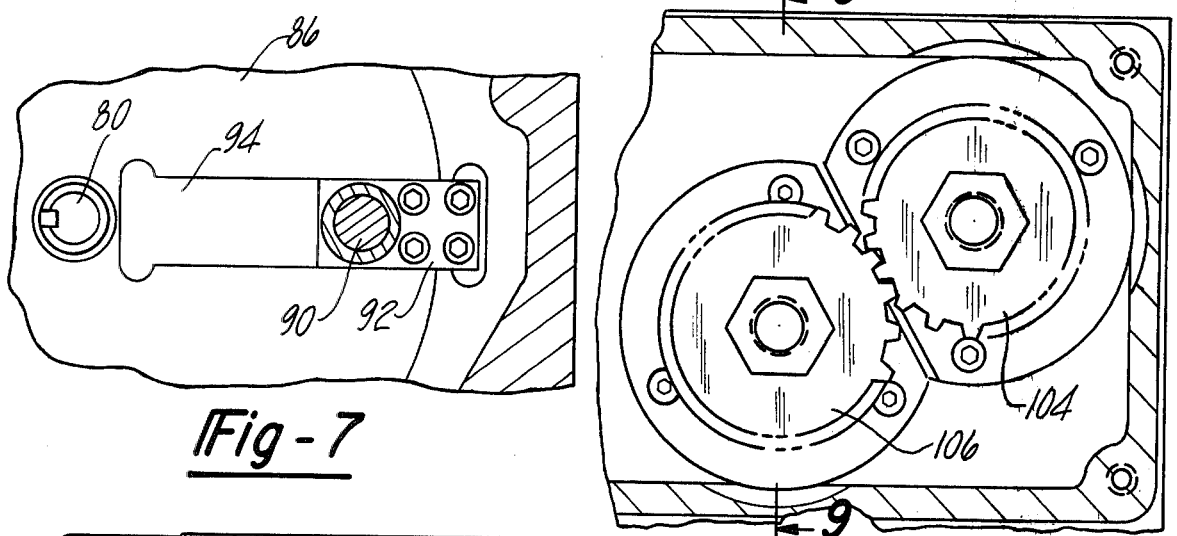
Fig-7
Fig-8
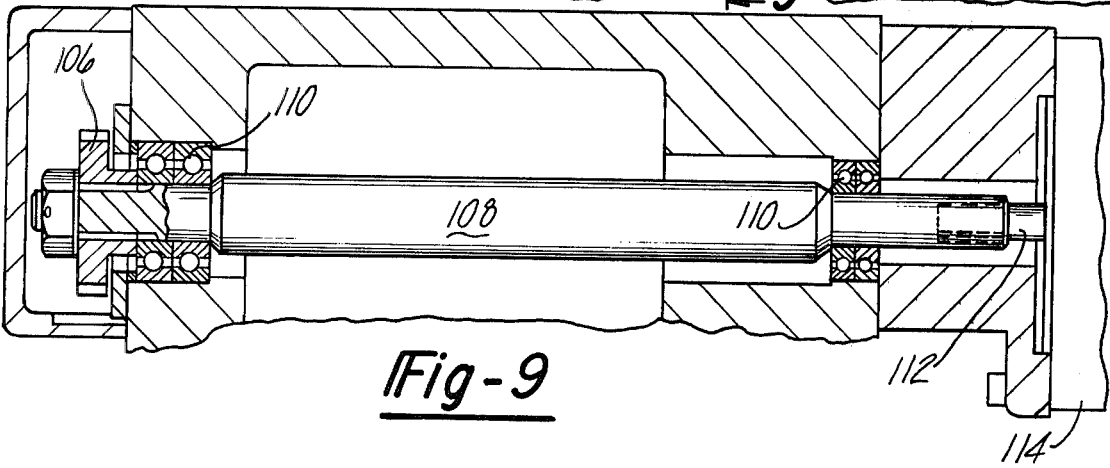
Fig-9

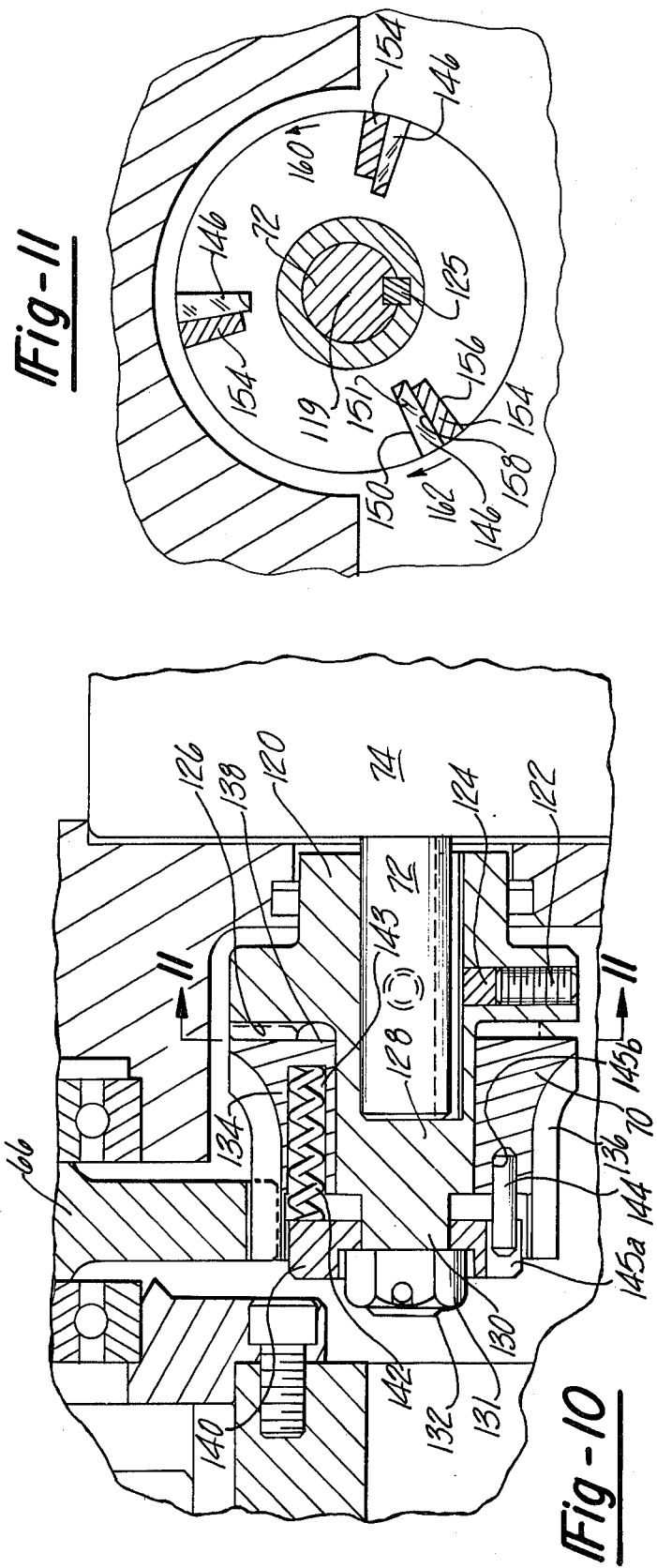

MACHINING APPARATUS TOOL FEED AND RETRACT SYSTEM

BACKGROUND OF THE INVENTION

The present invention relates generally to machining apparatus for performing a machining operation on a workpiece by reciprocally moving a tool toward and away from the workpiece, and more particularly, to a machining apparatus having an integrated feed unit for moving the work-performing tool reciprocally through a machining stroke and for retracting the tool to a fully retracted position where a tool change can be made.

Machining units such as those used to drill or tap workpieces are complex mechanisms with many moving parts in order to reciprocate the tool through a machining stroke and to retract the tool fully to a position where a tool change procedure can be implemented. Sometimes those units have interrelated slides and sub-slides for moving the tool carrier and, as a result, tool instability becomes a problem during the machining of a workpiece. These machining units tend to be bulky and expensive and yet lack all of the qualities desired in a machining unit for consistently producing quality workpieces at high volume production rates.

It is the general object of this invention, therefore, to provide machining apparatus having a feed and retract system which maintains tool stability. It is another object of the present invention to provide machining apparatus having a compact and integrated feed and retract system for moving a work-performing tool through a reciprocal machining stroke and for retracting the tool to a fully retracted tool change position.

SUMMARY OF THE INVENTION

The machining apparatus of the present invention includes a frame on which a tool carrier is reciprocally mounted for movement toward and away from a workpiece and a feed and retract system including a drive transmitting assembly movably mounted on the frame for reciprocal movement in the direction of movement followed by the tool carrier. The drive transmitting assembly is connected to the tool carrier and is driven reciprocally to move the tool carrier through a machining stroke.

The drive transmitting assembly consists of telescoping members which are relatively movable in one direction to move the tool carrier from a partially retracted position where the machining stroke is initiated to a fully retracted tool change position where the tool can readily be changed. A cam drive unit in the assembly is operable to reciprocate the telescoping members as a unit to move the tool through a machining cycle.

The drive transmitting assembly of the present invention eliminates the need for complex sub-slide assemblies and, as a result, increases tool stability by enabling the tool carrier to reciprocate on a stationary frame. Also, since the tool is moved through only a machining stroke by the cam unit during the machining of successive workpieces, unnecessary tool movement is eliminated. Only when a tool change is required will the tool carrier be retracted to its fully retracted position.

Another feature of this invention is the compactness of the feed unit by virtue of the integrated feed and retract system. This enables manufacture of the unit with relatively few components enabling manufacture at a relatively low cost.

Further objects, features and advantages of the present invention will become apparent from a consideration of the following description when taken in connection with the appended claims and the accompanying drawing in which:

FIG. 1 is a diagrammatic elevation view of the machining apparatus of this invention illustrating a work-performing tool positioned relative to a workpiece at a partially retracted position from where a machining stroke is initiated;

FIG. 2 is a diagrammatic elevation view of the machining apparatus of this invention like FIG. 1 showing the work-performing tool at the end of a machining stroke;

FIG. 7 is a fragmentary sectional view taken from the line 7—7 in FIG. 5 depicting the cam follower employed in the cam drive unit of the feed and retract system of this invention;

FIG. 8 is a fragmentary front end view of the feed and retract system of this invention taken substantially from line 8—8 in FIG. 3 showing meshed speed gears of the cam drive unit;

FIG. 9 is a fragmentary sectional view of the cam drive unit taken substantially from line 9—9 in FIG. 8;

FIG. 10 is an enlarged fragmentary sectional view of the tool retract drive unit shown in FIG. 3;

FIG. 11 is a fragmentary sectional view of the tool retract drive unit taken substantially from line 11—11 in FIG. 10; and FIG. 12 is a fragmentary view showing a modified form of the tool retract drive unit of the present invention.

Figure 4:
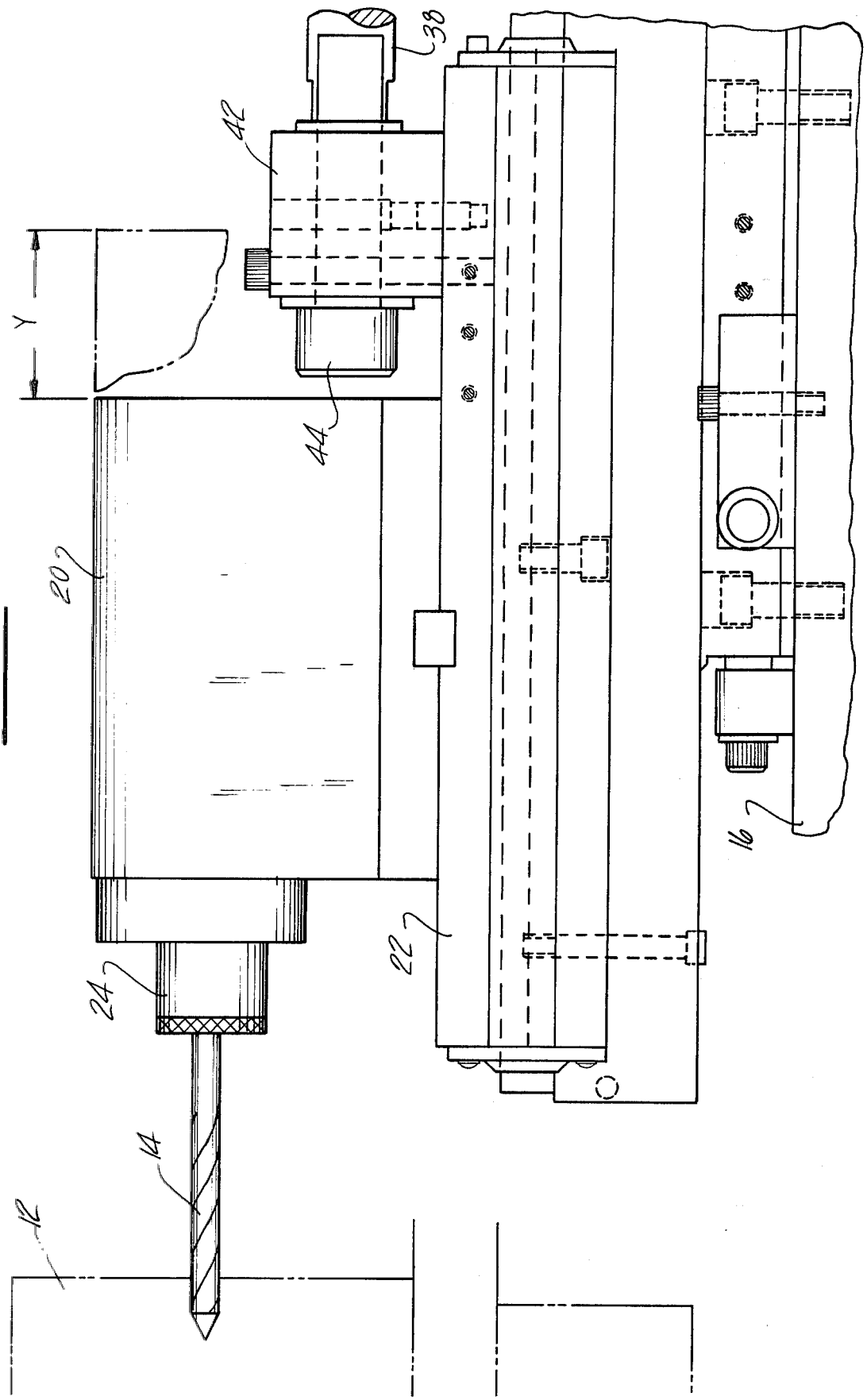
FIG. 4 is an enlarged fragmentary elevation view of the machining apparatus illustrated in FIG. 1 showing the work-performing tool and associated tool carrier at the end of a machining stroke.

Referring to the drawing, the machining apparatus of this invention, indicated generally at 10 in FIG. 1, operates to machine a workpiece 12 with a work-performing tool 14 such as a drill. Similarly, the concepts underlying this invention can be employed in a variety of types of machining apparatus such as tapping units, boring units, etc. The machining apparatus 10 includes a frame 16 to which guides or ways 18 are secured for guidably supporting a tool carrier 20 for reciprocal movement relative to the workpiece 12. The tool carrier 20, as shown in greater detail in FIG. 4, includes a spindle 24 in which the drill 14 is held and rotated by a motor (not shown). The tool carrier 20 is secured to a slide 22 that is movably mounted on the ways 18. The slide 22 and the tool carrier 20 are reciprocally movable back and forth in a generally linear path relative to the workpiece 12.

Figure 3:
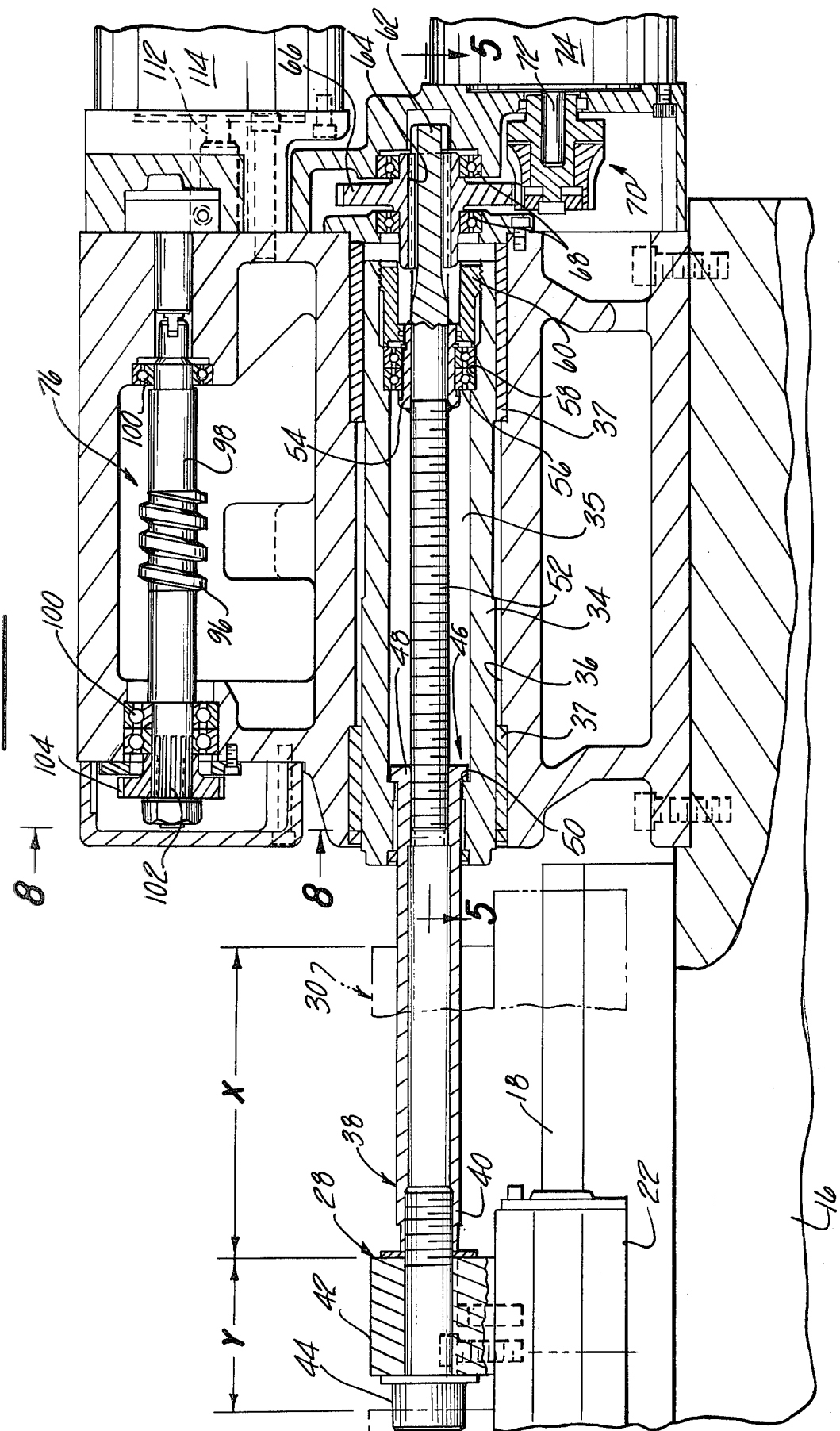
FIG. 3 is a fragmentary elevation view of the machining apparatus shown in FIG. 1 with portions broken away to illustrate the components of the feed and retract system of the machining apparatus of this invention.

The tool carrier 20 is moved through its reciprocal path by a feed and retract system 26 that functions to move the tool carrier from a partially retracted position, indicated generally at 28 in FIG. 1, through a distance "X" to a fully retracted position indicated generally at 30 (also see FIG. 3). The feed and retract system 26 further operates to move the tool carrier 20 from its partially retracted position 28 through a distance "Y" in a reciprocal machining stroke. The tool carrier 20 is shown in FIG. 2 at the end of the machining stroke with the drill 14 having been advanced into the workpiece 12 to drill a hole of a predetermined depth. During the machining of successive workpieces 12, the feed and retract system 26 functions to reciprocate the tool carrier 20 through its machining stroke. Only when a tool change is required will the feed and retract system 26 be actuated to retract the tool carrier 20 to its fully retracted position 30. As a result, the feed and retract system moves the tool 14 through a minimum distance prior to the actual drilling of the workpiece 12 for maximum utilization of the machining apparatus 10.

The feed and retract system 26 includes a drive transmitting assembly 32 (FIGS. 2 and 3) which is reciprocally mounted on the frame 16 for back and forth movement in substantially the direction the tool carrier 20 moves. The drive transmitting assembly 32 is connected to the slide 22 so that the reciprocal movement of the drive transmitting assembly 32 is transmitted to the slide 22.

The drive transmitting assembly 32 includes a quill 34 which is a hollow longitudinal tubular member having an internal passageway 35. The quill 34 is carried by bushings 37 which are disposed in a bore 36 in the frame 16. The quill 34 is reciprocally movable into and out of the bore 36. A hollow drive shaft 38 is telescoped inside the quill 34 for longitudinal movement relative to the quill 34. The drive shaft 38 and the quill 34 form extensible and contractible means for moving the tool carrier 20 between its partially retracted position 28 and its fully retracted position 30.

The drive shaft 38 has one end 40 connected to a mounting bracket 42 by a bolt 44 that is threadably fastened in the end 40 of the drive shaft 38. The other end 46 of the drive shaft 38 has a flange 48 that is engageable with a shoulder 50 formed on the quill 34 to limit the forward movement of the drive shaft 38 relative to the quill 34.

The quill 34 carries a screw member 52 having one end threadably mounted inside the end 46 of the drive shaft 38. The screw member 52 is rotatably secured to the quill 34 by a shoulder 54 and bearings 56 which are held in a recess 58 formed in the quill 34 by a threaded plug 60. The shoulder 54 and bearings 56 hold the screw member in a longitudinally fixed position with respect to the quill 34 while enabling the screw member 52 to be reversibly rotated.

The other end 62 of the screw member 52 is splined and meshes with a correspondingly splined inner bore 64 formed in a gear 66 which is rotatably mounted in bearing 68 on the frame 16. The gear 66 meshes with a gear or transmission unit 70 (FIG. 10) mounted on the shaft 72 of a motor 74 to form a tool retract or second drive means 75 for retracting the tool 14 from its partially retracted position 28 to its tool change position 30 (FIG. 3) where a new tool can be installed and for advancing the tool 14 back to its partially retracted position 28 where the machining stroke is initiated.

Since the quill 34 and therefore the screw member 52 are concurrently movable in longitudinal directions in the bore 36, the splined end 62 of the screw member 52 is movable in the splined bore 64 of the gear 66 to maintain a driving connection between the gear 66 and the screw member 52. Consequently, the quill 34 can be in different positions in the bore 36 and the motor 74 can be operated to rotate the screw member 52 to extend and contract the drive shaft 38.

Figure 5:
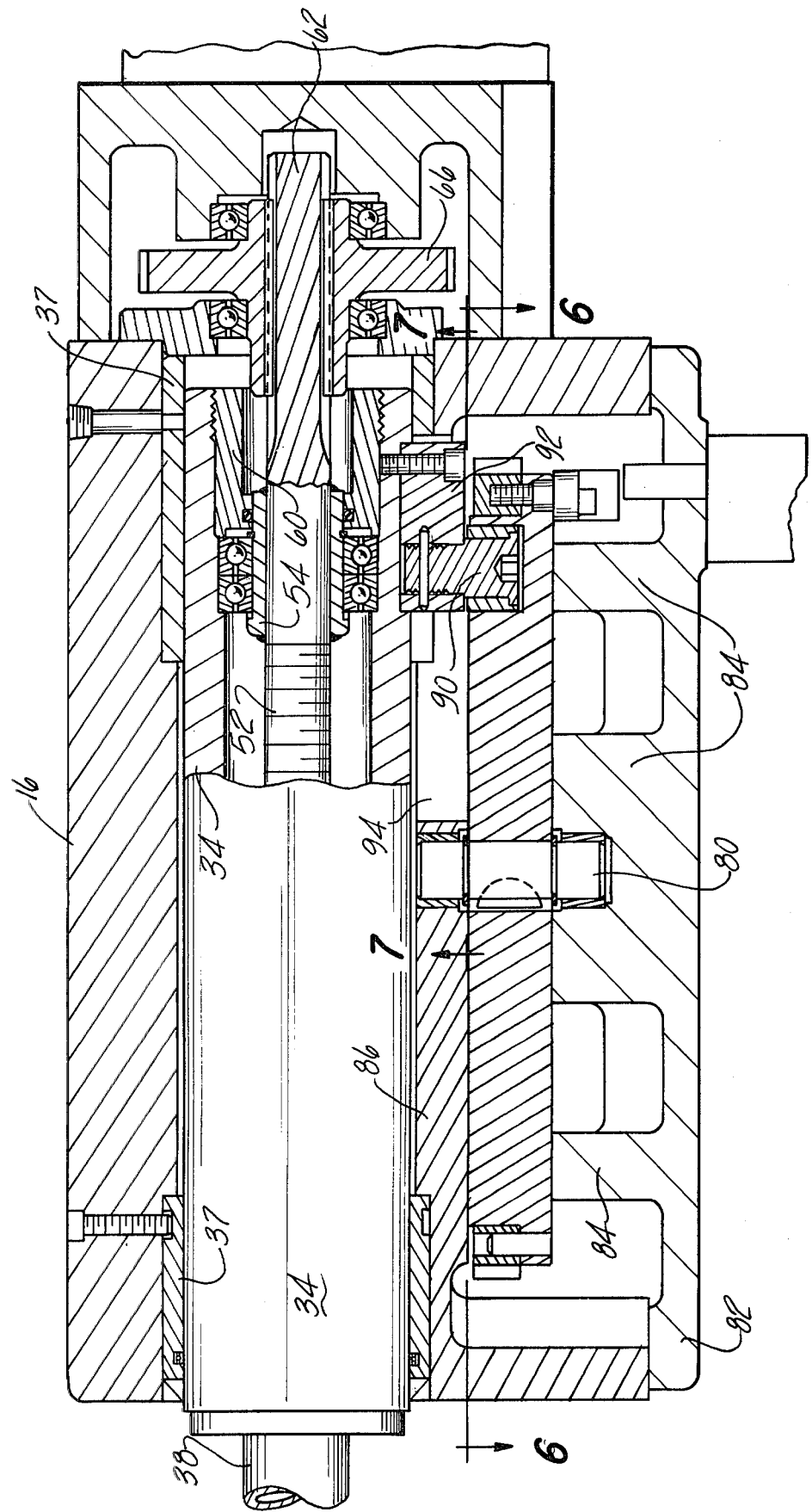
FIG. 5 is a top sectional view of the feed and retract system of the machining apparatus of this invention taken substantially from line 5—5 in FIG. 3.
Figure 6:
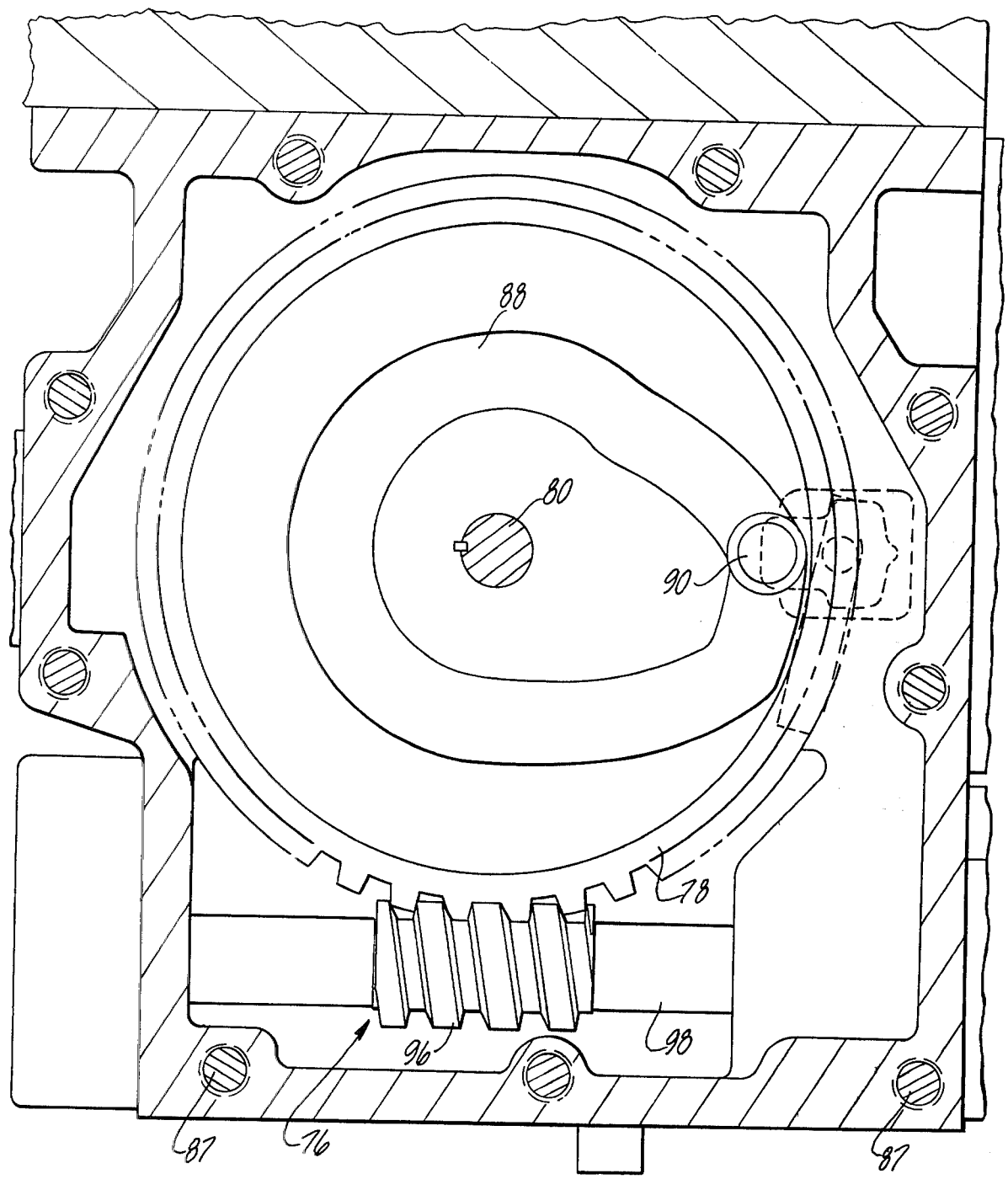
FIG. 6 is a side sectional view of the machining apparatus of this invention taken substantially from line 6—6 in FIG. 5 illustrating the cam drive unit in the feed and retract system of this invention.

The feed and retract system 26 also includes a first drive means in the form of a cam drive unit 76, shown in FIGS. 3, 5 and 6. With specific reference to FIGS. 5 and 6, the cam drive unit 76 includes a circular cam wheel 78 having gear teeth formed on its outer circumference. The cam wheel 78 is rotatably mounted by a pivot pin 80 in an upright position on the upright wall 86 of the frame 16. The cam plate 78 is held in place against the wall 86 of the frame 16. The cam plate 78 is held in place against the wall 86 by ribs 84 extending inwardly from a cam cover plate 82 which is secured to the wall 86 by bolts 87 and into which the pivot pin 80 is fitted.

As seen in FIG. 6, a cam groove or profile 88 is cut into the cam plate 78 which receives a cam follower 90 mounted on a boss 92 that is bolted on the quill 34 (FIG. 5). The cam follower 90 extends from the quill 34 through a slot 94 cut through the wall 86 and (FIG. 5 and FIG. 7) into the cam groove 88. The configuration of the cam groove 88 determines the length of the stroke of the quill 34 and the speed at which it is advanced and retracted. The cam plate 78 may have a specific groove cut into it for a particular feed approach and feed cut. Accordingly, the cam plate 78 can be rotated with a constant velocity and by virtue of the particular cam profile 88 the cam follower 90 and therefore the quill 34 and the tool carrier 20 will be advanced and retracted through a predetermined distance at the desired speed.

As shown in FIG. 5, the cam plate 78 is in a position in which the cam follower and the quill 34 are in the rear-most position in the bore 36 with the tool carrier 20 in the partially retracted position since the drive shaft 38 is fully extended. From this position, the cam follower 90 will be moved to the left as seen in FIG. 5 as the cam plate 78 is rotated. The continued rotation of the cam plate 78 thereafter will cause the cam follower 90 to return to its FIG. 5 position.

The teeth of the cam plate 78 are meshed with a worm gear 96 (FIGS. 3 and 6) carried by a worm shaft 98 which is rotatably supported on the frame 16 by bearings 100. The worm shaft 98 has a splined end 102 on which a speed gear 104 is removably mounted. The speed gear 104 is meshed with another speed gear 106, as seen in FIG. 8, which is similarly removably mounted on a drive shaft 108 that in turn is rotatably mounted on the frame 16 (FIG. 9) by bearings 110 and is connected to the output shaft 112 of a cam drive motor 114 (FIG. 3). The cam drive motor 114 is a constant speed motor so that the rotational velocity of the worm shaft 98 is determined by the gears 104 and 106.

The gear unit 70, as seen in FIGS. 10 and 11, consists of a drive head or first drive member 120 fixedly mounted on the shaft 72 by a set screw 122 and key 124 retained in a keyway 125 formed in the shaft 72. The drive head 120 has a circular flat face 126 that is generally perpendicular to the axis of rotation 119 of the shaft 72. The drive member 120 also includes a circular spindle portion 128 from which extends a shaft portion 130 whose terminal end is threaded at 132. A gear or second drive member 134 is mounted on the spindle portion 128 and is rotatable on the drive head 120. The gear 134 is provided with external gear teeth 136 which mesh with the teeth on the gear 66 and a circular flat face 138 which is generally perpendicular to the axis of rotation 119 of the drive shaft 72 and which is positioned in a face-to-face relationship with the face 126 of the drive head 120.

A back-up plate 140 is secured on the shaft portion 130 of the drive head 120 by a nut 131 and springs 142 (one shown) are interposed between the back-up plate 140 and the gear 134 and are confined in the openings 143 (one shown) to urge the gear 134 against the drive head 120. Pins 144 (one shown) are positioned in aligned openings 145a and 145b in the plate 140 and the gear 134 and lock the back-up plate 140 to the gear 134 so that they rotate simultaneously.

Interference means in the form of three equiangularly spaced-apart teeth 146 (FIG. 11) are formed on the face 126 of the drive head 120 and extend radially with respect to the axis of rotation 119 of the drive head 120. Each tooth 146 has on one side a flat surface 150 extending generally perpendicular with respect to the face 126 of the drive head 120 and on the other side a curved surface 151 curving outwardly from the face 126 until it meets the surface 150. The interference means also includes circumferentially and equiangularly spaced-apart teeth 154 formed on the face 138 of the gear 134 which correspond to the circumferentially spaced-apart positions of the teeth 146 on the drive head 126. The teeth 154 extend radially with respect to the axis of rotation 119 and each has generally flat surfaces 156 and 158 on opposite sides thereof extending perpendicular with respect to the surface 138 on the gear 134. As shown in FIG. 11, the flat surfaces 156 of the teeth 154 are engaged by the curved sides 151 of the teeth 146 of the drive head 120 and are in the positions they will occupy when the drive unit 70 is driven to advance the tool 14 forwardly.

When the drive unit 70 is operated to advance the tool 14, the drive head 120 is rotated counterclockwise in the direction of the arrow 160 (FIG. 11). The curved surfaces 151 of the teeth 146 engage the flat surfaces 156 of the teeth 154 on the gear 134, as shown in FIG. 11. The springs 142 hold the gear 134 against the drive head 120 with a sufficient force so that rotation of the drive head 120 causes rotation of the gear 134 by virtue of the engagement of the teeth 146 and 154. When the drive shaft 38 has been fully advanced to a position where the flange 48 engages the shoulder 50, a continued rotation of the drive head 120 will cause it to rotatively slip relative to the gear 134. This slippage results from the curved surfaces 151 overcoming the frictional resistance with the surfaces 156 and riding over the teeth 154 on the stopped gear 134 as the gear 134 is pushed axially against the springs 142 on the shaft portion 128 away from the drive head 120. Thus, the curved surfaces 151 along with the teeth 154 and the springs 142 form a release means for overriding the interference means. The relative movement between the drive head 120 and the gear 134 when the drive shaft 38 is fully extended prevents damage to any of the components for advancing and retracting the tool 14 and also decreases the likelihood that the screw member 52 will become jammed in the drive shaft 38. When the drive shaft 38 is fully advanced and the motor 74 is turned off, the drive head 120 will be in a position relative to the gear 134 where the curved surfaces 151 of the teeth 146 engage the flat surfaces 156 of the teeth 154.

The motor 74 is reversibly operated to retract the tool 14 by rotating the drive head 120 clockwise in the direction of the arrow 162, as shown in FIG. 11. The teeth 146 traverse the spaces between adjacent teeth 154 to strike the flat surfaces 158 of the teeth 154 with their flat surfaces 150. Reverse movement of the drive head 120 wherein the teeth 146 move momentarily free of engagement with the teeth 154 enables the drive head 120 to gain momentum so that when the teeth 146 do engage the teeth 154, they create a "hammer action" against the teeth 154 which insures that the gear 134 and screw member 52 will be rotated to retract the drive shaft 38. Consequently, if the threads of the screw member 52 and the drive shaft 38 are jammed, the "hammer action" will dislodge the screw member 52 from the drive shaft 38. Retraction of the tool 14 will terminate when a limit switch (not shown), for example, is engaged and actuated to cut off operation of the motor 74.

A modified form of the tool retract drive unit is illustrated at 170 in FIG. 12. The drive unit 170 consists of an air motor 172 mounted on the quill 34 by a mounting assembly 176. A drive shaft 178 connects the output shaft 180 of the air motor 172 directly to the screw 52a and is rotatably supported on the quill 34 by bearings 179. When the cam unit 76 is operated to reciprocate the tool 14 in a machining stroke, the air motor 172 is carried by the quill 34. The motor 172 is reversibly operated to turn the screw member 52a to advance and retract the tool 14.

In operation, assume the tool carrier 20 is in its FIGS. 1 and 3 positions in which it is located at its partially retracted position 28 with the tool 14 in spaced relationship with a workpiece 12; the cam drive motor 114 then is activated and through the drive shaft 112 and the worm shaft 98, the cam drive plate 78 is rotated in one direction. As can be seen from FIG. 5, rotation of the cam plate 78 advances cam follower 90 to the left through the slot 94 to carry the quill 34 forwardly. As a result, the entire drive transmitting assembly 32 is moved forwardly with respect to the frame 16 to move the tool carrier 20 through the distance "Y" in a machining stroke. Continued rotation of the cam plate 78 will cause the cam follower 90 to pull the quill 34 rearwardly to its FIG. 3 and FIG. 5 positions as it tracks in the cam profile 88. For each successive workpiece 12, the cam drive unit 76 will reciprocate the drive transmitting assembly 32 back and forth to effect the machining of the workpiece.

Referring to FIG. 3, the slide 22 is shown in the partially retracted position 28 wherein the screw member 52 has been rotated to extend the drive shaft 38 forwardly with respect to the retracted quill 34 to the most forward position where the flange 48 on the drive shaft 38 engages the shoulder 50 on the quill 34. Normally, the machining of the workpiece 12 is performed with the drive shaft 38 in its extended position. Assume that a tool change is in order. The screw drive motor 74 is activated to rotate the screw member 52 through the transmission unit 70 in a direction to cause the drive shaft 38 to telescope into the quill 34. The drive motor 74 continues operation until the slide 22 has been retracted to its full retracted position 30 which can be sensed by the limit switch (not shown) that causes the motor 74 to be turned off. At this fully retracted tool change position, the tool 14 is easily changed. Afterwards, the screw drive motor 74 is activated to rotate the screw drive member 52 in a direction to extend the drive shaft 38 to its fully extended position to return the tool carrier 20 to its partially retracted position where the machining stroke can be initiated.

It is not necessary for the quill 34 to be in its fully retracted position in order to operate the screw member 52 to move the tool carrier 20. Since the end 62 of the screw member 52 is splined and meshes with the splined bore 64 of the gear 66, the screw member 52 can be rotated to extend and retract the drive shaft 38 regardless of the relative position of the quill 34 in the bore 36 as the screw member 52 is movable with respect to the gear 66.

As can be seen from the above description, the present invention provides an improved machining apparatus that utilizes an integrated feed and retract system 26 for reciprocating the tool carrier 20 through a machining stroke and, when required, for retracting the tool carrier 20 from its partially retracted position to its fully retracted position where a tool change can be made. Employment of the drive transmitting assembly 32 which itself is reciprocally movable on the frame 16 and which consists of the telescoping members 34 and 38 results in a compact and relatively inexpensive unit that when operated, produces minimum tool movement in the machining of successive workpieces. Tool stability is assured since the slide 22 which carries the tool carrier 20 is mounted on a stationary frame 16.

As pointed out above, the drive member 120 is slippable on the gear 134 when the drive shaft 38 is fully extended to prevent the threads on the screw member 52 and the drive shaft 38 from being jammed together. As a result, damage and wear of the components are reduced and there is added time after the drive shaft 38 is fully extended for turning off the motor 74.

It is claimed:

1. Machining apparatus for machining a workpiece with a work-performing tool comprising a frame, a tool carrier movably mounted on said frame for reciprocal movement relative to a workpiece, feed means for reciprocating said tool carrier between a fully retracted tool change position and a partially retracted position in a clearance relation with the workpiece and for moving said tool carrier from said partially retracted position toward and away from the workpiece through a reciprocal machining stroke, said feed means including a drive transmitting assembly having extensible and contractible means thereon connected to said tool carrier, means mounting said drive assembly on said frame for reciprocal movement substantially in the direction said tool carrier is reciprocally moved, first drive means for moving said drive assembly so as to move said tool carrier through a machining stroke, and second drive means operatively associated with said extensible and contractible means for moving said tool carrier between said fully and partially retracted positions.

2. The machining apparatus according to claim 1, wherein extensible and contractible means comprises relatively movable members, said members being relatively movable in opposite directions to move said tool carrier between said fully and partially retracted positions.

3. The machining apparatus according to claim 2, wherein said movable members are arranged in a telescoping relationship in which one of said members is movable longitudinally inside an adjacent one of said movable members.

4. The machining apparatus according to claim 3, wherein said extensible and contractible means includes a screw member threadably connected with said one movable member whereby rotation of said screw member moves said one member to move said tool carrier between said partially and fully retracted position.

5. The machining apparatus according to claim 4, wherein said screw member is fixed longitudinally with respect to said other movable member.

6. The machining apparatus according to claim 1, wherein said second drive means includes motor means having an output, and gear means meshed with said output and said screw member, said screw member being movable longitudinally with respect to said gear means in response to movement of said other movable member.

7. The machine apparatus according to claim 1, wherein said first drive means comprises a cam drive assembly mounted on said frame, said cam drive assembly being connected to said drive transmitting assembly so as to move said tool carrier through said machining stroke.

8. The machining apparatus according to claim 7, wherein said cam drive unit includes a cam gear wheel rotatably mounted on said frame and having a cam path formed thereon, a cam follower mounted on said drive transmitting assembly and disposed in said cam path whereby rotation of said cam wheel is translated into generally linear movement of said drive transmitting assembly.

9. The machining apparatus according to claim 8, wherein said second drive means includes motor means, a worm drive shaft connected to said motor means and having a worm gear meshed with said cam wheel to drive said cam wheel.

10. In a machining apparatus for machining a workpiece with a work-performing tool wherein said apparatus includes a frame and a tool carrier mounted on said frame for reciprocal movement relative to a workpiece, a drive transmitting assembly connected to said tool carrier for reciprocally moving said tool carrier relative to a workpiece, said drive transmitting assembly being movably mounted on said frame for reciprocal movement substantially in the direction said tool carrier moves to reciprocate said tool carrier, said drive transmitting assembly comprising extensible and contractible means including relatively movable members wherein relative movement of said members in one direction moves said tool carrier toward a workpiece and relative movement of said members in the opposite direction retracts said tool carrier from the workpiece.

11. The drive transmitting assembly according to claim 10, wherein one of said relatively movable members is telescoped inside an adjacent other of said members, said telescoped members being movable in opposite directions in a generally straight line path.

12. The drive transmitting assembly according to claim 11, wherein said other telescoped member is movably mounted on said frame and carries said one telescoped member.

13. The drive transmitting assembly according to claim 12, wherein said extensible and contractible means includes a screw member rotatably mounted on said other telescoped member and is threadably engaged with said one telescoped member so that rotation of said screw member causes relative movement between said telescoped members.

14. The machining apparatus according to claim 6 wherein said second drive means includes a transmission unit acting between said motor output and said gear means for transmitting the output of said motor to said gear means.

15. The machining apparatus according to claim 14 wherein said transmission unit comprises a drive member and a gear member operatively associated with said gear means and movable relative to said drive member, coacting teeth means on said gear and drive members engageable to transmit the movement of said drive member to said gear member.

16. Machining apparatus according to claim 15 wherein said teeth means are arranged in selected spaced-apart locations on said gear and drive members enabling movement of said drive member through a selected distance relative to said gear member prior to the engagement of said coacting teeth means to impart a hammer action on said gear member to initiate its movement when said coacting teeth means are engaged.

17. Machining apparatus according to claim 15 wherein said coacting teeth means include release means enabling relative movement of said drive member relative to said gear member when said gear member is restrained from movement.

18. In a machining apparatus for machining a workpiece with a work-performing tool wherein said apparatus includes a frame on which said work-performing tool is mounted for movement through a defined path and drive means for moving said work-performing tool through said path, characterized in that said drive means comprises a first and second drive member mounted for rotation about a common axis of rotation, means acting between said second drive member and said work-performing tool to cause said work-performing tool to move through said defined path in response to rotation of said second drive member, interference means acting between said drive members for transmitting the rotation of said first drive member to said second drive member, said interference means including lost motion means enabling relative rotational movement of said drive members through a selected angle of rotation when said first drive member is rotated so that said interference means imparts a hammer action against said second drive member to initiate its rotation.

19. The machining apparatus according to claim 18 wherein said interference means includes release means operable to override said interference means to enable relative rotation of said drive members when one of said drive members is constained from rotational movement.

* * * * *